US008489627B1

(12) United States Patent
Brandt

(10) Patent No.: US 8,489,627 B1
(45) Date of Patent: Jul. 16, 2013

(54) COMBINED SEMANTIC DESCRIPTION AND VISUAL ATTRIBUTE SEARCH

(75) Inventor: Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 646 days.

(21) Appl. No.: 12/200,856

(22) Filed: Aug. 28, 2008

(51) Int. Cl.
*G06F 17/30* (2006.01)

(52) U.S. Cl.
USPC .......................................................... 707/765

(58) Field of Classification Search
USPC ......................................... 382/103; 707/765
See application file for complete search history.

(56) References Cited

U.S. PATENT DOCUMENTS

2006/0143176 A1* 6/2006 Mojsilovic et al. ................ 707/6
2006/0251292 A1* 11/2006 Gokturk et al. ................ 382/103

OTHER PUBLICATIONS

"A content Based Image and Video Search and Catalog Tool for the Web", [Online]. Retrieved from the Internt: <Url: http://ei.cs.vt.edu/~ mm/cache/WebSeek.htm>,(May 26, 2008),2 pgs.
"About Behold", [Online]. Retrieved from the Internet: <URL: http:www.beholdsearch.com/about/>,(May 26, 2008),4 pgs.
"About Like.com", [Online]. Retrieved from the Internet: <URL: http://www.like.com/aboutus.py>,(May 26, 2008),1 pgs.
"ANN: A Library for Approximate Nearest Neighbor Searching", http://www.cs.umd.edu/~mount/ANN/, [Online]. Retrieved from internet: <URL:http://www.cs.umd.edu/~mount/ANN/?>, Release Date: Aug. 4, 2006,(May 27, 2008),2 pgs.

"Bag of Words Model in Computer Vision", [Online]. Retrieved from the Internet <URL:http://en.wikipedia.org/wiki/Bag_of_words_model_in_computer_vision>,(May 26, 2008),5 pgs.
"Content-Base Image Retrievel", [Online]. Retreived from the Internet: <URL:http://en.wikipedia.org/wiki/CBIR>,(May 26, 2008),5 pgs.
"imgSeek: What is imgSeek?", [Online]. Retreived from the Internet: <URL:http://www.imgseek.net>,(May 26, 2008),3 pgs.
"Non-negative matrix factorization", [Online]. Retrieved from internet: <URL: http://en.wikipedia.org/wiki/Non-negative_matrix_factorization>,(May 27, 2008),3 pgs.
"Photology—Learn More", [Online]. Retrieved from Internet: <URL: http://www.getphotology.com/learnMore.html,(May 26, 2008),2 pgs.
"Scale-invariant feature transform", [Online]. Retrieved from the Internet: <URL:http://en.wikipedia.org/wiki/Scale-invariant_feature_transform>,(May 27, 2008),7 pgs.
Arya, Sunil , et al., "An optimal algorithm for approximate nearest neighbor searching fixed dimensions", *Journal of the ACM (JACM)*, 45(6), (1998),891-923.

(Continued)

*Primary Examiner* — Huawen Peng
(74) *Attorney, Agent, or Firm* — Schwegman, Lundberg & Woessner, P.A.

(57) ABSTRACT

An image search method includes receiving a first query, the first query providing a first image constraint. A first search of a plurality of images is performed, responsive to the first query, to identify a first set of images satisfying the first constraint. A first search result, which includes the first set of images identified as satisfying the first constraint, is presented. A second query is received, the second query providing a second image constraint with reference to a first image of the first set of images. A second search of the plurality of images is performed, responsive to the second query, to identify a second set of images that satisfy the second constraint. A second search result, which includes the second set of images identified as satisfying the second constraint, is presented.

41 Claims, 11 Drawing Sheets

OTHER PUBLICATIONS

Blei, David M., et al., "Latent Dirichlet Allocation", *Journal of Machine Learning Research*, 3, (2004),993-1022.

Blei, David M., et al., "Modeling annotated data", *Proceedings of the 26th Annual International ACM SIGIR Conference on Research and Development in Informaion Retrieval*, (2003),127-134.

Carson, C., et al., "Blobworld: image segmentation using expectation-maximization and its application to image querying", *IEEE Transactions on Pattern Analysis and Machine Intelligence*, 24(8), (Aug. 2002),1026-1038.

Csurka, G., et al., "Visual Categorization with Bags of Keypoints", *ECCV Workshop on Statistical Learning in Computer Vision*, (2004),16 pgs.

Elango, Pradheep K., et al., "Clustering Images Using the Latent Dirichlet Allocation Model", [Online]. Retrieved from the Internet: <URL:http://pages.cs.wisc.edu/~pradheep/Clust-LDA.pdf>,(Dec. 2005),18 pgs.

Everingham, Mark, et al., "The 2005 PASCAL Visual Object Classes Challenge", *Pascal Technical Report*, (2005),65 pgs.

Felzenszwalb, Pedro F., et al., "Efficient Graph-Based Image Segmentation", *Intl Journal of Computer Vision* vol. 59 No. 2, (Sep. 2004),26 pgs.

Flickner, M., et al., "Query by Image and Video Content: The QBIC System", *Computer*, 28, Theme Feature,(Sep. 1995),23-32.

Grauman, K., et al., "Unsupervised Learning of Categories from Sets of Partially Matching Image Features", *IEEE Computer Society Conference on Computer Vision and Pattern Recognition*, vol. 1, (2006),19-25.

Griffiths, Thomas L., et al., "Finding Scientific Topics", *Proceedings of the National Academy of Sciences* vol. 101 Suppl 1, (Apr. 6, 2004),5228-5235.

Horster, E., et al., "Fusing Local Image Descriptors for Large-Scale Image Retrieval", *Computer Vision and Pattern Recognition*, 2007. CVPR 07. IEEE Conference on Jun. 17-22, 2007, 1-10.

IBM, "QBIC—IBM's Query by Image Content", [Online]. Retrieved from the Internet: <URL: http://wwwqbic.almaden.ibm.com>,(May 26, 2008),1 pgs.

Jurie, F., "Creating efficient codebooks for visual recognition", *Tenth IEEE International Conference on Computer Vision*, ICCV 2005, vol. 1, (2005),604-610.

Larlus, Diane, et al., "Latent mixture vocabularies for object categorization", *British Machine Vision Conference*, (2006),10 pgs.

Lars-Jacob, Hove, "Evaluating Use of Interfaces of Visual Query Specification", *Norwegian NOKOBIT 2007 Conference*, (Nov. 2007),15 pgs.

Lee, Daniel D., et al., "Algorithms for Non-negative Matrix Factorization", *Advances in Nueral Informations Processing Systems 13: Proceedings of the 2000 Conference.*, MIT Press,(2000),556-562.

Lowe, David G., "Distinctive Image Features from Scale-Invariant Keypoints", *International Journal of Computer Vision*, 60(2), 2004, 91-110.

Maree, Raphael, et al., "Random Subwindows for Robust Image Classification", *Proceedings of the 2005 IEEE Computer Society Conference on Computer Vision and Pattern Recognition (CVPR'05)—vol. 1*, (2005),34-40.

Nister, David, et al., "Scalable Recognition with a Vocabulary Tree", *Proceedings of the 2006 IEEE Computer Society Conference on Computer Vision and Pattern Recognition—vol. 2*, (2006),2161-2168.

Nowak, Eric, et al., "Sampling strategies for bag-of-features image classification", *European Conference on Computer Vision*, ECCV 2006, (May 2006),14 pgs.

Oliva, Aude, et al., "Modeling the Shape of the Scene: A Holistic Representation of the Spatial Envelope", *International Journal of Computer Vision*, 42(3), (2001),145-175.

Philbin, J., et al., "Object Retrieval with Large Vocabularies and Fast Spatial Matching", *Proceedings of the IEEE Conference on Computer Vision and Pattern Recognition*, (2007),8 pgs.

Russell, B. C., et al., "Using Multiple Segmentations to Discover Objects and their Extent in Image Collections", *IEEE Computer Society Conference on Computer Vision and Pattern Recognition*, vol. 2, (2006),1605-1614.

Sivic, Josef, et al., "Object Level Grouping for Video Shots", *International Journal of Computer Vision*, (2006),14 pgs Sivic, Josef, et al., "Visual Geometry Group: Video Google Demo", [Online]. Retrieved from the Internet: <URL: http://robots.ox.ac.uk/~vgg/research/vgoogle/index.html>,(May 26, 2008),3 pgs.

Vasconcelos, Nuno, et al., "A Unifying View of Image Similarity", *Proceedings 15th International Conference on Pattern Recognition*, (Sep. 2000),5 pgs.

Zhang, Jianguo, et al., "Local Features and Kernels for Classification of Texture and Object Categories: A Comprehensive Study", *Conference on Computer Vision and Pattern Recognition Workshop*, (2006),8 pgs.

Zhang, Jianguo, et al., "Local Features and Kernels for Classification of Texture and Object Categories: An In-Depth Study", *INRIA Research Report*, INRIA—Unite de Recherche INRIA Rhone—Alpes Institut National Polytechnique de Grenoble—INPG,(2005),1-42.

Jurie, F., "Creating efficient codebooks for visual recognition", *Tenth IEEE.International Conference on Computer Vision*, ICCV 2005, vol. 1, (2005),604-610.

Lowe, David G., "Distinctive Image Features from Scale-Invariant Keypoints", *International Journal of Computer Vision*, 60(2), (2004),91-110.

Nister, David, et al., "Scalable Recognition with a Vocabulary Tree", *Proceedings of the 2006 IEEE Computer Society Conference on Computer.Vision and Pattern Recognition—vol. 2*, (2006),2161-2168.

Sivic, Josef, et al., "Object Level Grouping for Video Shots", *International Journal of Computer Vision*, (2006),14 pgs.

\* cited by examiner

COMBINED SEMANTIC DESCRIPTION AND VISUAL ATTRIBUTE SEARCH

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, ADOBE SYSTEMS INCORPORATED, All Rights Reserved.

BACKGROUND

Many current image search systems are text-based, and depend on meta-data and tagging to provide search keys. One example of such a text-based image search system is the Google Image Search service, which allows users to search the web for image content. The keywords for Google Image Search are based on the filename of the image, the link text pointing to the image, and/or text adjacent to the image. While searching for an image, a thumbnail of each matching image is displayed.

Recently, a number of advances have been made with respect to computer vision research. Specifically, content-based image retrieval (CBIR), also known as query by image content (QBIC), and content-based visual information retrieval (CBVIR), are applications of computer vision to facilitate image retrieval and searching of digital images in large databases. "Content-based" image retrieval typically involves an analysis of the actual contents of an image (e.g., colors, shapes, textures and other information that can be derived from the image itself). Without the ability to examine image content, searches may rely on meta-data, such as captions and keywords, which may be laborious and expensive to produce. It is worth noting that Google introduced its "image labeler" feature, in the form of a game, which encourages users to label random images to help improve the quality of Google's meta-data based image search service.

BRIEF DESCRIPTION OF DRAWINGS

Some embodiments are illustrated by way of example and not limitation in the figures of the accompanying drawings in which.

DETAILED DESCRIPTION

Figure 1:
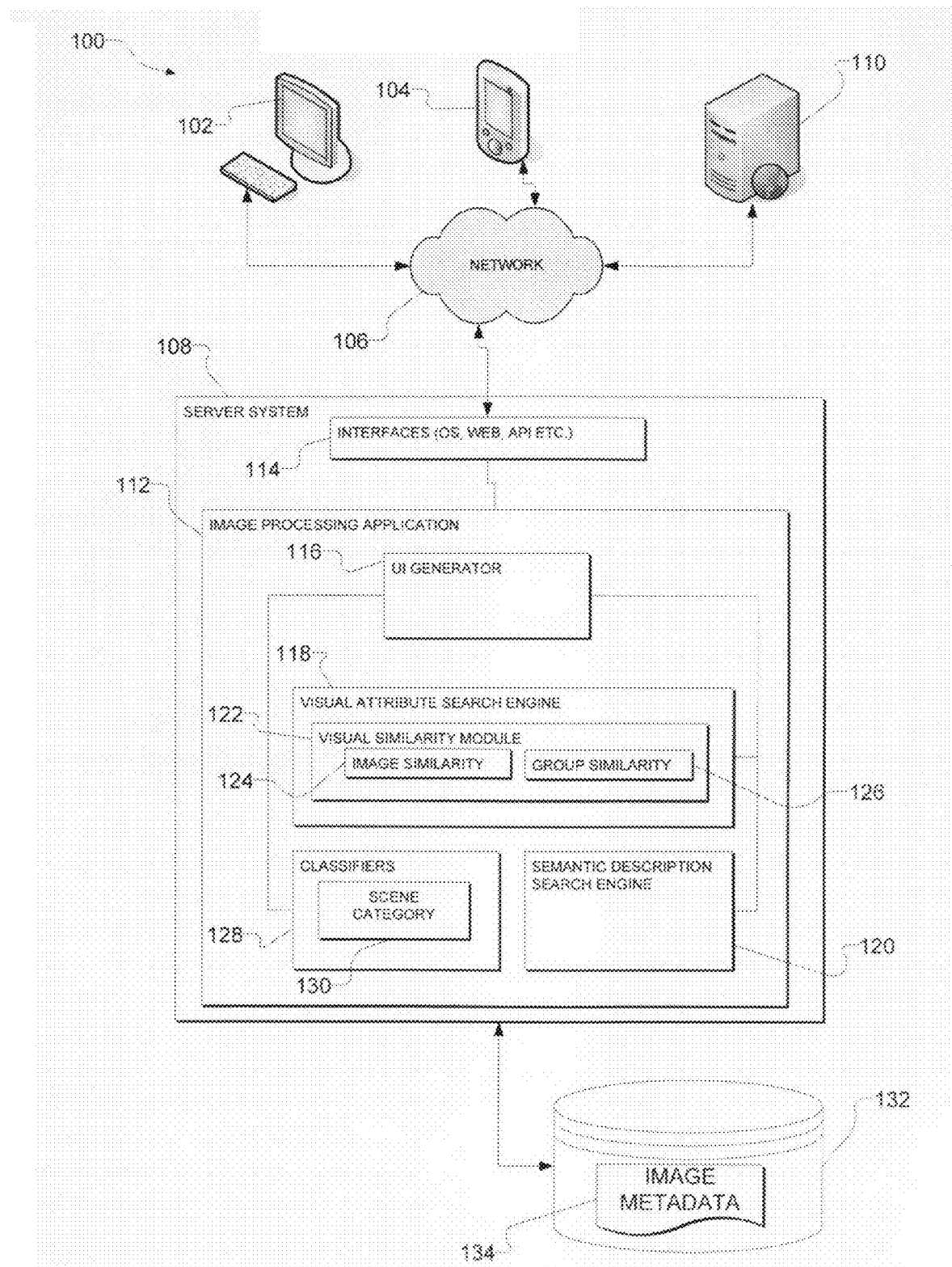
FIG. 1 is a block diagram illustrating a system within which combined image semantic description and visual attribute search functionality, according to various example embodiments, may be provided.

In the following description, for purposes of explanation, numerous specific details are set forth in order to provide a thorough understanding of some example embodiments. It will be evident, however, to one skilled in the art that the present invention may be practiced without these specific details.

An example embodiment combines the capabilities of semantic description searching (e.g., scene category classification or tagging) and visual attribute searching (e.g., visual similarity) into a unified search capability that enables interactive exploration of sets or collections of images, and that additionally allows the search result from a preceding search to be used in the construction of subsequent queries. Additionally, an example embodiment allows images to be grouped based on the visual attributes for content (e.g., visual similarity) to facilitate the formation of training sets for image semantic description (e.g., classification into scene categories).

An example embodiment proposes the integration of semantic description (e.g., scene category classification) and visual attribute (e.g., visual similarity) search functionality into an integrated image search. In one example embodiment, a user interface generator presents a first search interface module, within an integrated search interface, to receive a semantic image description constraint from a user. The user interface generator similarly presents a second search component, also within the search interface and in association with the first search interface module, to receive a visual attribute constraint (e.g., as reflected in a selected image) from a user.

Search engines (e.g., an image content or a visual search engine and a meta-data search engine) may then receive, via the search interface, one or more queries against an image database, the one or more queries including at least one semantic image description constraint and/or at least one visual attribute constraint.

In one example embodiment, a semantic search engine may receive a semantic image description query, the semantic image description query specifying the semantic image description constraint. The semantic search engine may then perform a semantic search, with respect to a number of images (e.g., within an image database), to identify a first set of images satisfying the semantic constraint. The visual attribute search engine may receive a visual attribute query specifying a visual attribute constraint expressed, for example, with reference to a selected image from the first set of images. The visual attribute search engine may then perform a visual attribute search of the number of images, based on the visual query, to identify a further set of images that satisfy the visual attribute constraint (e.g., to identify images that are visually similar to the user-selected image).

According to one example embodiment, an interface may be generated that allows a user to combine visual attribute constraints (e.g., visual similarity) with semantic description constraints (e.g., scene category membership).

According to a further example aspect, there is provided a semantic description generator, in the example form of a scene category classifier, which operates to perform image categorization. One example embodiment may deploy a scene category classifier to evaluate and store scene category membership values, or relative membership confidence values for a set of images. The scene category classifier may, in the example embodiment, evaluate a given image to generate a category membership confidence factor in a range (e.g., [0 . . . 1]) indicating a relative confidence that the image belongs to a given scene category. Examples of scene categories may include "mountain", "beach", "indoors", "city", etc. In one example embodiment, the scene category classifier used a visual attribute, or attributes, of an image to classify an image and may employ a so-called "bag of words" model to represent a visual attribute of an image, as is described in further detail below.

One example embodiment further includes a visual attribute module, in the example form of a visual similarity module, which ranks a set of images according to a correspondence between visual attributes (e.g., visual similarity) of a reference or query image and the set of images. For example, a similarity confidence factor or value may be in the range of [0 . . . 1], where 1 means that an image of the set of images is identical to a given reference or query image. The example embodiment may also employ a visual similarity module to create a tree data structure to rapidly evaluate a specified number of approximate nearest neighbors (e.g., visually similar images) to a given reference or query image.

As noted above, an example embodiment may allow for the sequential use of semantic description and visual attribute constraints as part of the search process, or may enable the construction of a compound query including both semantic description and visual attribute constraints. In one example embodiment, a compound relevance value may be calculated for each image within an image result set that is a product of a category membership confidence value and a visual similarity confidence value, for example.

A further example embodiment may allow a user to associate semantic description information (e.g., tags or categories) with images included in the search result. In one example embodiment, a user may define a new user-defined scene category, and tag images within a particular search result (e.g., generated using a semantic description or visual attribute constraint) as belonging to the new user-defined scene category. A training process (e.g., a machine learning algorithm) may be used to train a scene category classifier for new user-defined image categories.

The results of a "visual similarity" or other content search may facilitate tagging by grouping visually similar images together. A semantic description search (e.g., a "scene category" search) may enable a user to conveniently identify "false positives", and tag such images as counterexamples for a particular user-defined category. The training process employed by a scene category classifier may enable categories to be learned and improved upon transparently without interfering with the user's ongoing activities and interactions with, for example, an image processing application. This training process may thus be a "background" process or daemon, which continually monitors user interaction with a body of images to identify user selection (or deselection) of a particular image within the body of images as being a member of a user-defined image category.

According to a further embodiment, a visual similarity module may include a "group similarity" function to evaluate visual similarity between groups of images. For example, a user may designate a set of images through UI interaction. Similarity between groups of images may be quantified as a statistic on a pair-wise similarity of images in two sets. For example, a minimum or median similarity value of the most similar image pairs between two sets may be used as such a statistic.

Further details regarding the various example embodiments described above will now be discussed with reference to the figures accompanying the present specification.

FIG. 1 is a block diagram illustrating a system 100 within which semantic image description and visual attribute search functionality, according to various example embodiments, may be provided. The example system 100 employs a client-server architecture. It will however be appreciated that various embodiments may be deployed in standalone systems (e.g. a standalone computer system hosting an image processing application) or in peer-to-peer or distributed computer systems. Furthermore, while certain functions, components and modules are shown to reside on single computer systems, these functions, components and modules may, in various embodiments, be distributed across any number of machines.

The system 100 includes a number of client devices in the form of a laptop or a desktop computer system 102 and a mobile device 104 (e.g., Personal Digital Assistant (PDA), a mobile telephone etc.) that communicate via one or more networks 106 with a server system 108. The server system 108 may also be connected via the networks 106 with a further remote server system 110, in order to provide functionality and services to the remote server system 110 (e.g., to provide software as a service (SaaS)). The client devices 102 and 104 may host client applications (e.g., a web browser or other client application) that interact with an image processing application 112 hosted by the server system 108. Interactions between various client applications and the image processing application 112 may be facilitated via one or more interfaces 114 provided by the server system 108.

The server system 108 hosts an image processing application 112, which may be a dedicated image processing application (e.g., a photo management and presentation application such as Adobe® Photoshop® Express or Adobe® Premier® Express) or may be the image processing and handling component of another application. The image processing application 112 includes a user interface generator 116 that operationally generates user interfaces and user interface modules to present information, for example, within the context of client applications executing on the client machines 102 and 104. In one example embodiment, the user interface generator 116 is responsible for the generation of a visual search interface, to be described in further detail below. The visual search interface enables a user to perform both semantic image description searches and visual attribute searches, and also to create compound queries that are composed of both semantic description and visual attribute constraints. To this end, the user interface generator 116 is communicatively coupled to a visual attribute search engine 118 and to a semantic description search engine 120. The visual attribute search engine 118, in turn, includes a visual similarity module 122, which may operationally perform pairwise comparisons between images (e.g., between a query or reference image and a collection of search images, respectively) to assess a degree of similarity between the images. To this end, the visual similarity module 122 may include individual image similarity functionality 124 and group image similarity functionality 126. While the individual image similarity functionality 124 may operate to perform pairwise comparisons between individual images, the group image similarity functionality 126 may operate to identify similarity between a reference group of images and one or more search images. Further details regarding an example embodiment of the visual similarity module 122 are provided below.

The image processing application 112 may further include one or more image classifiers 128, the image classifiers 128 including a scene category classifier 130 that categorizes images into one of a number of scene categories. In one example embodiment, the scene category classifier 130 may evaluate and store scene category membership values reflecting a confidence that the scene category classifier 130 is to attribute to a particular image's membership of a particular scene category. Again, further details regarding a specific example embodiment are provided below.

The image processing application 102, and accordingly the above described components thereof, are communicatively coupled, as illustrated in FIG. 1, to a database 132, in which is a stored image metadata 134 (e.g. reference data establishing a location within a file system at which actual image data is stored, and other data pertaining to and describing respective images). The image metadata 134, as will be described in further detail with reference to FIG. 2, may be searchable by the visual attribute search engine 118 and the semantic search engine 120. Additionally, the visual attribute search engine 118 may write visual attribute information that it discerns from one or more images to the database 132. Similarly, the classifiers (e.g., the scene category classifier 130) may write data pertaining to images in the database 132, and in this way contribute to the creation of image metadata 134.

Figure 2:
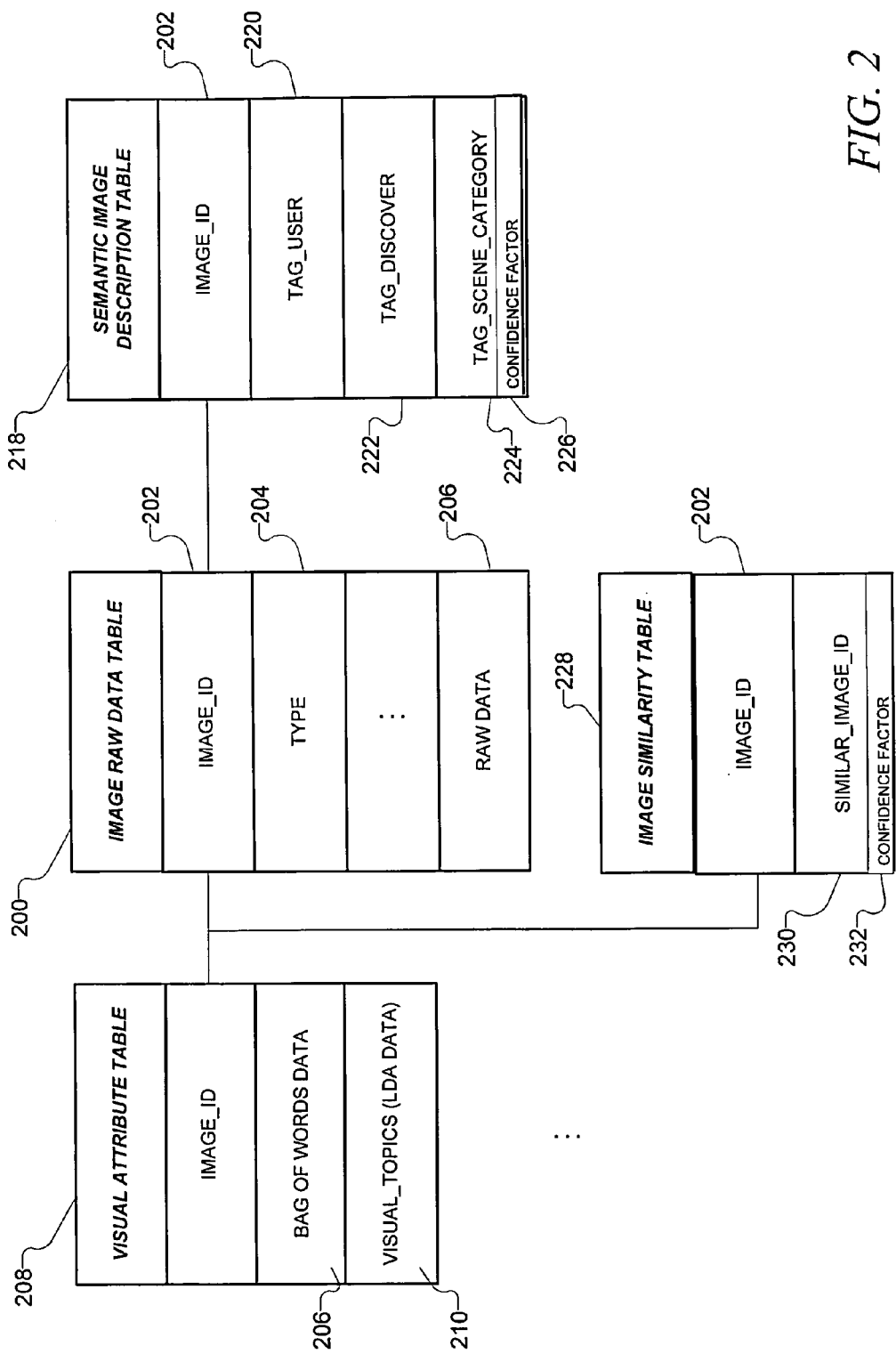
FIG. 2 is an entity-relationship diagram illustrating example tables that may form part of the image data, in an example embodiment, stored within the database.

FIG. 2 is an entity-relationship diagram illustrating tables that may form part of the image metadata 134, in an example embodiment, stored within the database 132. The tables include an image data table 200, including an image identifier index field 202, a type field 204 indicating an image format or type (e.g., raster formats such as JPEG (Joint Photographic Experts Group), TIFF (Tagged Image File Format), RAW, PNG (Portable Network Graphics), GIF (Graphics Interchange Format), or the BMP (Bitmap) format). The raw data of the image may be stored in a separate file system (not shown).

An image identifier value stored in the image identifier index field 202 is indexed into a visual attribute table 208, in which may be stored various visual attribute information pertaining to a particular image. In one embodiment, the visual attribute information stored in the table 208 may be discerned by the visual attribute search engine 118, and written into the table 208. For example, the visual attribute search engine 118 may, upon uploading an image to the database 132, perform an analysis of the image to identify, discern and store various visual attributes. In one example embodiment, the visual attributes stored in the table 208 may include "bag of words" data 206 and Latent Dirichlet Allocation (LDA) values 210, which summarize attributes derived from integrating direct visual attributes, such as color and texture. In another example embodiment, direct visual attribute data that may be stored within the table 208.

The table 200 is similarly indexed to a semantic image description table 218, which is populated with various fields storing semantic image description information. In one example embodiment, the semantic image description information may comprise tags or category information that is associated with a particular image. In one example embodiment, a first number of tag fields 220 may include user-defined and provided tags, a second set of tag fields 222 may store a tag or descriptive information discerned or discovered from other meta-data associated with the images (e.g., links to the images), and a third set of tag fields 224 may include scene category tags 224 that are determined by the scene category classifier 130. Each of the scene category tags 224 may additionally have a confidence factor 226 associated therewith, indicating a confidence level generated by the scene category classifier 130 in the scene categorization of the particular image as performed by the classifier 130. In other embodiments, the tag and category membership information is stored in separate tables. Each table may for example store a tuple having the schema:

(image_id, tag_id, tag_value)

A separate system-wide table may be used to identify a tag_id with a tag name.

The image metadata 134 may further include that being may be maintained as a hierarchy or tree structure constructed and maintained by the visual similarity module 122. Further details regarding such a tree structure are provided below with reference to FIG. 9. In one embodiment, applicable to a system in which a limited number of images are searched, the similarity data may comprise one or more image similarity tables 228 that store, for a particular image, a list of image identifiers for images determined by the visual similarity module 122 to be similar to a particular reference image. In one embodiment, a confidence factor 232 may also be stored in association with each "similar" image identifier 230 to reflect a relative confidence in the similarity between the reference image and the "similar" image. The confidence factors 232 may also be generated by the visual similarity module 122, written to the image metadata 134 and stored within the database 132.

Figure 3:
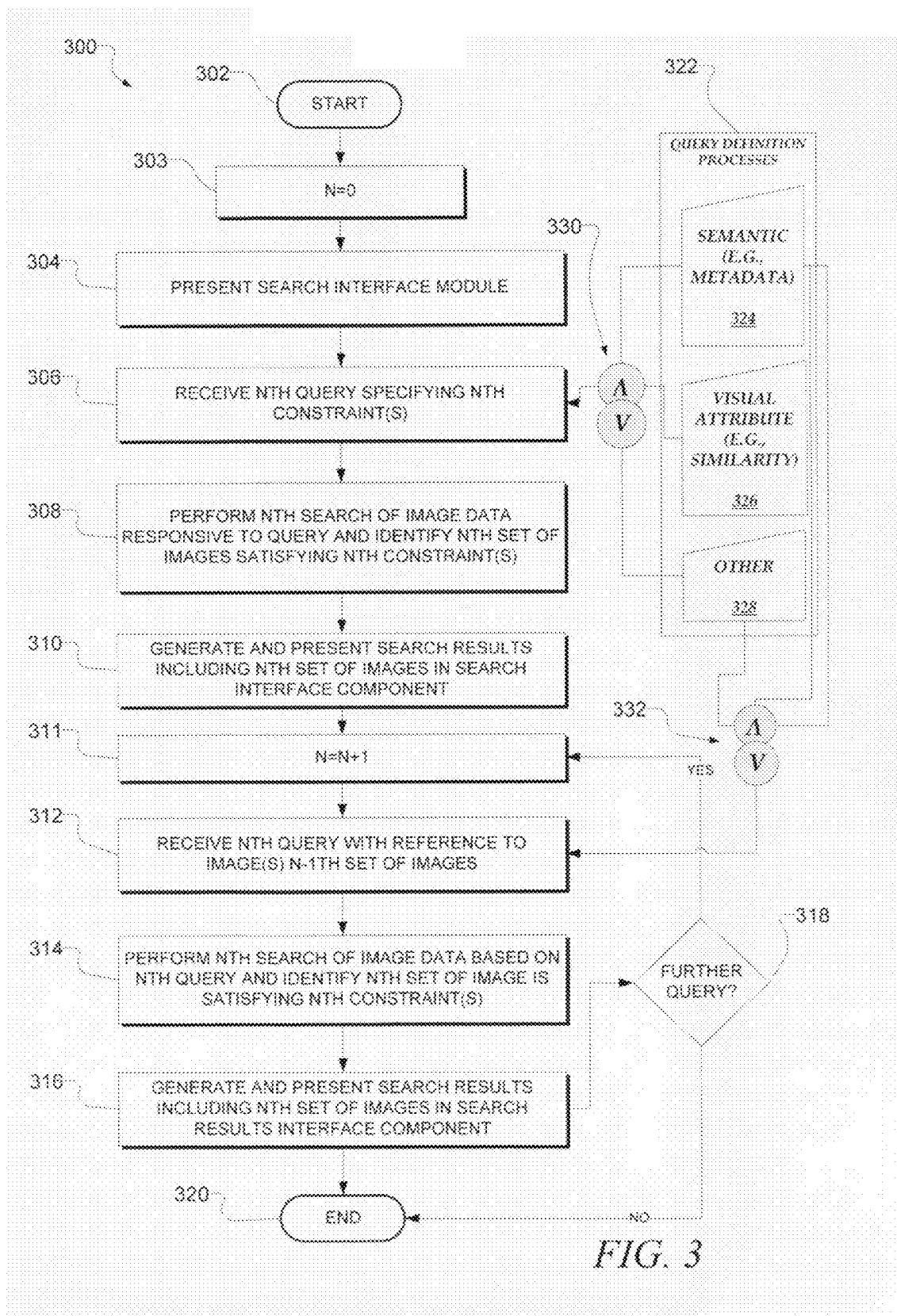
FIG. 3 is a flow chart illustrating a method, according to an example embodiment, of seeding a second search using results of a preceding, first search.

FIG. 3 is a flow chart illustrating a method 300, according to an example embodiment, of seeding a search using the results of a preceding search. In the example method 300, a semantic description (e.g., metadata) search may be used to seed a subsequent visual attribute (e.g., visual similarity) search. The inverse may apply, and a visual attribute search may be used to seed a subsequent semantic description query. In other example embodiments, a semantic description search may be used to seed the query of a subsequent semantic description search, and likewise the results of a first visual attribute search may be used to seed the visual query for a second, subsequent visual attribute search. Various combinations of semantic, visual attribute, and other data type searches may also be used either as a seeding search or as a subsequent search.

The method 300 commences at operation 302, and proceeds to operation 303, where a search increment value N is set to zero. At operation 304, a type-specific search interface module (e.g., a semantic search module or a visual attribute search module) is generated as part of an image search interface, and presented to a user to receive a query constraint.

Figure 4:
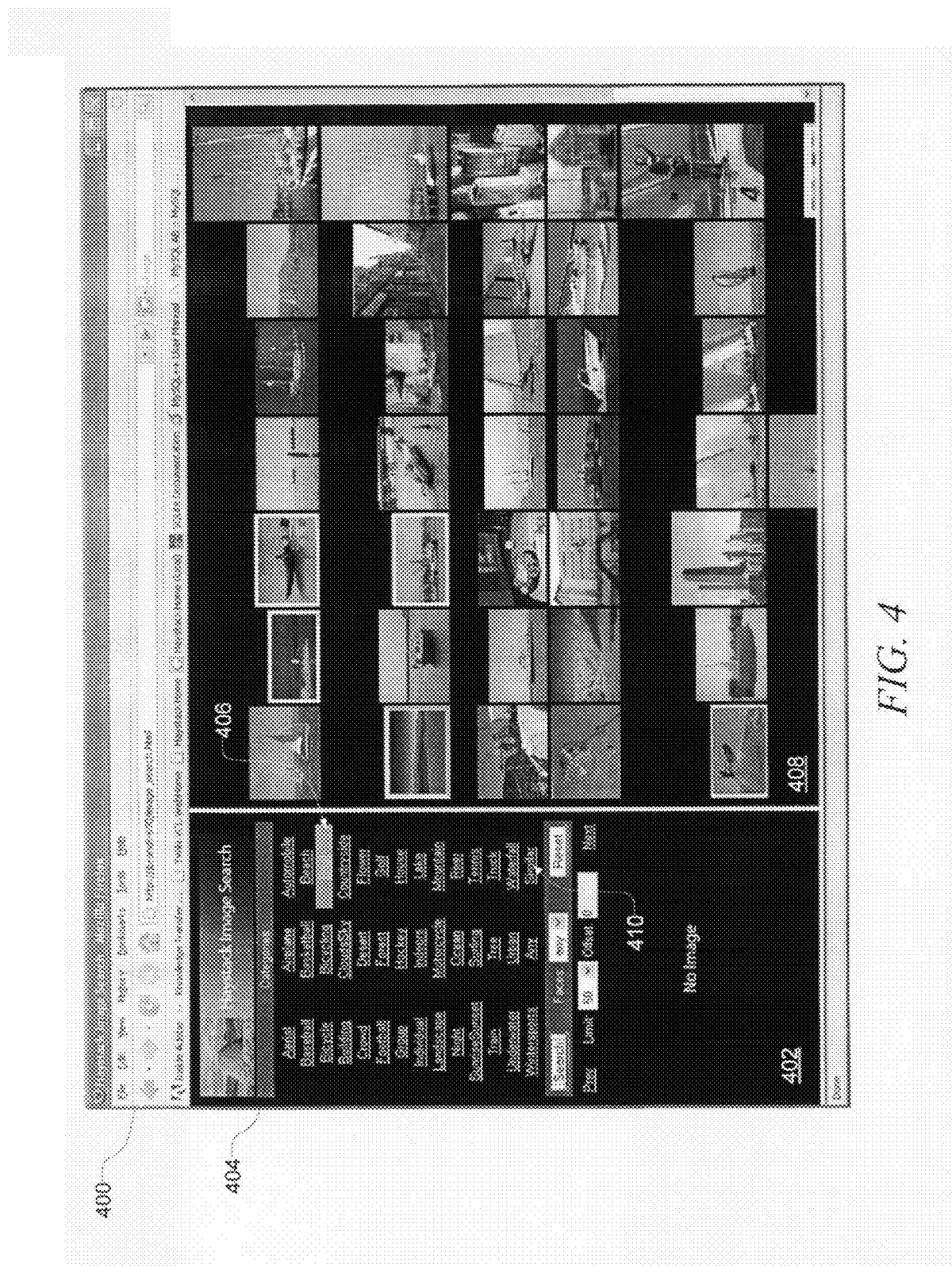
FIG. 4 is a screenshot illustrating an image search interface, according to an example embodiment.

FIG. 4 is a screenshot illustrating an image search interface 400, according to an example embodiment which may be generated at operation 304. FIG. 4 further shows a semantic description search interface module 402, within the image search interface 400, which may be presented at operation 304 to receive a semantic description constraint. For example, the semantic description search interface module 402 presents a number of user-selectable scene category descriptors 404. In one example embodiment, the scene category descriptors 404 are each a hypertext link embedding a query string that may be communicated, for example, from a computer system 102, via an appropriate interface 114, to the semantic description search engine 120 of an image processing application 112. The search interface 400 may be presented via an image processing application executing on a standalone machine, or may be presented via a client application (e.g., a browser or a dedicated image processing application client) executing on a computer system 102 or 104.

Returning to FIG. 3 at operation 306, the image processing application 112 receives a query that specifies one or more constraints. For example, the semantic description search engine 120 may receive a semantic description query that specifies a semantic description (e.g., image metadata) constraint in the form of a classification constraint (e.g., a scene category).

FIG. 3 illustrates that a number of query definition processes 322 may provide input at operation 306 in order to define a query. Each of a semantic, visual attribute or other data type query definition process 324, 326 and 328 may be represented by a respective query type search module (e.g., such as the semantic description search interface module 402) within an image search interface. The query definition processes 324, 326 and 328 output respective constraints to the image processing application 112. The query definition processes 322 are used to create either single constraint queries (e.g., the query received at operation 306 includes only one of a semantic, visual attribute or other type of constraint), or compound constraint queries (e.g., the query receipt of operation 306 includes multiple constraints of multiple types that may be ANDed or ORed together to form a compound constraint). To this end, the outputs of the query definition processes 322 are shown to be subject to AND/OR operations 330 and 332.

The other data query definition process 328 may enabled a user to define any one of the number of other types of constraints to be included within a search query. Examples of such constraints may include date and other metadata constraints, so as to enable a user to iteratively define and focus search queries.

At operation 308, one or more search engines (e.g. the semantic description search engine 120 or the visual attribute search engine 118) then perform a search of the image database 132, responsive to the query, to identify a first set of images that satisfy the query constraint. For example, where query includes a semantic description constraint in the form of a scene category identifier (e.g., the identifier "boat"6, as user selected from the category descriptors 504 within the interface module 502), the semantic description search engine 120 may identify all images within the database 132 within the relevant category (e.g., that contain the value "boat"). This may be performed using the tuple (image_id, tag_id, value) described elsewhere herein. The semantic description search engine 120 may also at this point retrieve confidence factors 226 for each image identified to be in the "boat" scene category, and rank the located set of images according to the images' respective confidence factors 226.

At operation 310, the user interface generator 116 may then generate and present search results, including the set of images identified at operation 308, in a second, visual attribute query search interface module of a search interface. Referring again to FIG. 4, there is shown an example visual attribute search interface module 408, which is presented in association with the search interface module 502 (e.g., as a concurrent presentation, sequential presentation or presentation within a common flow). The visual attribute interface module 408 is shown to include a set of images that satisfy the "boat" scene category constraint, associated with the indicium 406. Further, the set of images displayed within the interface module 408 are sorted according to respective and associated confidence factors 226, in a descending order from highest to lowest confidence factor.

At operation 311, the search increment value N is incremented by 1. At operation 312, the image processing application 112 (e.g., the visual attribute search engine 118) receives a further query (e.g., a visual attribute query). As shown in FIG. 3, the further query received at operation 312 may also be a single constraint query defined by any one of the query definition processes 322, or a compound constraint query defined by the combined output of any one of the query definition processes 322. For the purposes of illustration, consider an example in which the query received at operation 312 is a visual attribute query. The visual attribute query provides an image constraint expressed with reference to one or more images of the set of images presented within the visual query interface module at operation 310. Referring again to FIG. 5, a user may construct a visual attribute query, in the example form of a visual similarity query, by selecting one or more images from the images presented within the interface module 408, and then select the "similar" image indicium 410 within the interface module 402. The interface may further include a control to indicate which visual attribute is to be used as the basis for as similarity analysis (e.g., Color composition, visual topic, texture etc.) These user selections, specifically the selection of the indicium 410, may cause a query, identifying one or more user-selected images, to be identified to the visual attribute search engine 118.

At operation 314, the image processing application 112 performs a subsequent search response to a query, which is specified, at least partially, using the results of a preceding search, and identifies a set of images that satisfy a constraint (or constraints) of the query. In a specific example, responsive to a visual attribute query received at operation 312, the visual attribute search engine 118, and specifically the visual similarity module 122, performs a visual attribute search (e.g., a visual similarity search) to identify a set of images satisfying the visual attribute constraint (e.g., being similar to the one or more images user selected from the interface module 508). To this end, the visual attribute search engine 118 may access the visual attribute table 208 for one or more images included within the query to identify values for various visual attributes of the reference image. Using the determined attribute values for the reference image, the search engine 118 may then locate further images having similar visual attribute values.

In a further embodiment, the similarity module 122 may access similarity data (e.g., hierarchical data below with reference to FIG. 9 or the image similarity table 228) identifying similar images having associated confidence factors 232. Accordingly, the performance of the visual attribute search at operation 314 may include performing a lookup on the similarity data using one or more reference images, to locate similar images.

At operation 316, the user interface generator 116 then generates and presents search results, including a set of images identified at operation 314, within an image search interface module.

Figure 5:
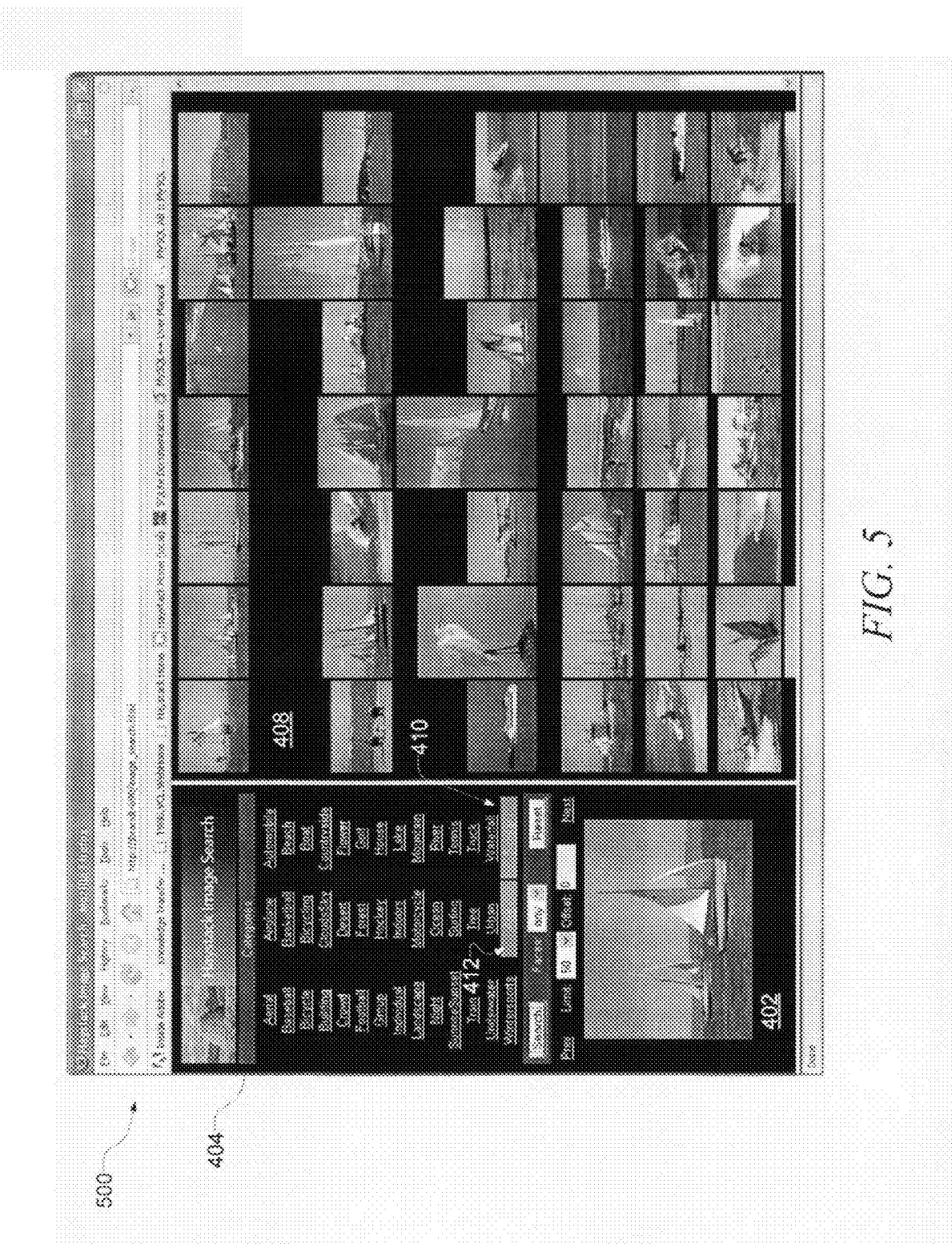
FIG. 5 is a screenshot illustrating an interface state, according to an example embodiment, showing a result set generated by a visual attribute search being presented within a visual query interface module of the interface.

FIG. 5 is a screenshot illustrating an interface state 500, according to an example embodiment, showing a result set generated by a visual attribute search, being presented within the visual query interface module 408. The "similar" image indicium 410 is highlighted within the interface module 402 to indicate that the search result within the interface module 408 reflects the result of a visual similarity search. Additionally, it will be noted that "any" scene category indicium 412 is highlighted to indicate the lack of a filter with respect to an image scene category (i.e., the results shown in the interface module 408 was not filtered on an image scene category).

Having presented a set of images in an interface module at operation 316, the method 300 may then enter any number of iterations of searches, as reflected by decision operation 318. Specifically, upon receipt of a further query, the method 300 may loop back to operation 311.

In the absence of any further search iterations, the method 300 then terminates at operation 320.

In various example embodiments, it will be appreciated that a single constraint query may generate results, which may then in turn be used to seed a subsequent compound query (e.g., two or more constraint query). For example, referring to the interface 400, a user may specify one or more image scene categories by selecting one or more category indicium from within the interface module 402. Alternatively, a user may select one or more images from within the interface module 408, followed by a selection of the "similar" image indicium 410.

In this example, an appropriate search engine (e.g., the visual attribute search engine 118 or the semantic description search engine 120) performs a search of the image database 132, and identifies a set of images satisfying the single-type constraint.

The user interface generator 116 generates and presents the search results, including the set of images, in an appropriate interface module.

The image processing application 112 receives a compound query against the image metadata 134 stored in databases 132. In one example embodiment, the compound query includes multiple constraint types (e.g., both visual attribute and semantic description constraints).

Figure 6:
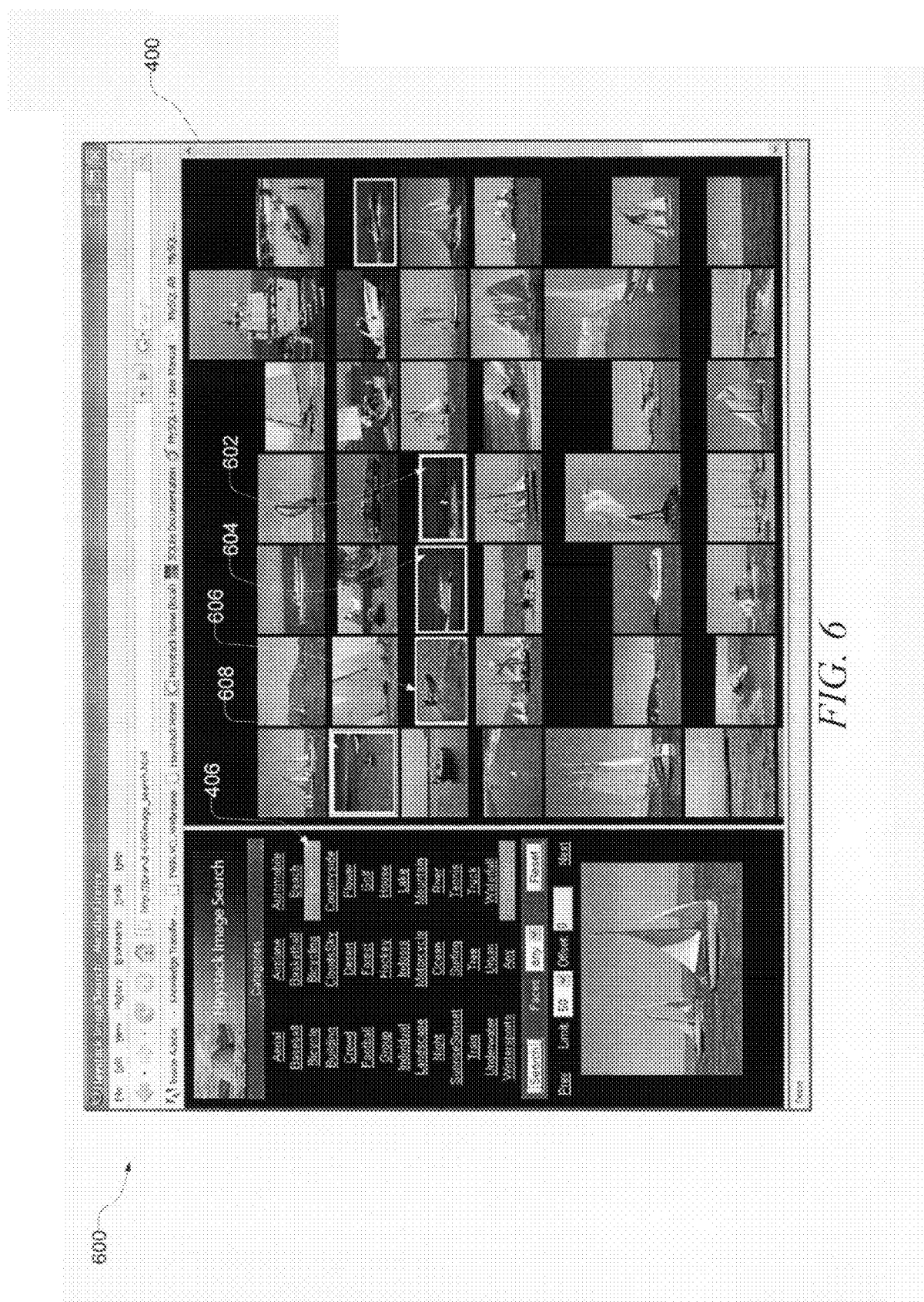
FIG. 6 is a screenshot illustrating a further interface state, according to an example embodiment, showing how a user may interact with a search interface to specify a compound query.

FIG. 6 is a screenshot illustrating an example interface state 600 showing how a user may interact with the interface 400 to specify a compound query. As will be noted, the user has selected (e.g., activated) the "boat" scene category indicium 406, thus specifying a semantic description constraint. In addition, the user has shown to have selected a number of images 602-608, which selection is inputted by user selection (e.g., activation) of the "similar" indicium 410, thus enabling the user to specify a visual attribute (e.g., visual similarity) constraint. Accordingly, the user is able to specify both a semantic constraint and a visual attribute constraint, and accordingly to create a compound query, which is communicated to the image processing application 112. The image processing application 112, upon receiving the compound query, proceeds to perform a search of the image database 132 based on the compound query. The image processing application 112 identifies a second set of images satisfying the multiple types of constraints (e.g., visual attribute constraint and a semantic description constraint). To this end, the image processing application 112 may, upon receiving the compound query, parse the query and allocate the different constraints to respective types of search engines (e.g., the visual attribute search engine 118 and the semantic description search engine 120) so as to have the search engines initiate the respective searches.

The results returned from the respective search engines may include confidence factors associated with each image, indicating a level of confidence that each image satisfies an appropriate constraint type. Search results, which include the second set of images in a particular search component interface (e.g., the interface module 408), are then presented and generated. As part of the presentation of the search results, the search results may be presented in a rank ordering according to one or more confidence factors. In one embodiment, a compound confidence factor may be calculated by the user interface generator 116, based on the confidence factors returned from the respective types of search engines (e.g., based on a visual similarity confidence factor and an image category membership confidence factor). In a further embodiment, the user may be presented with the option to specify which confidence factor should be applied, or whether any one of the confidence factors should be given a higher weighting in the presentation of the search results than another confidence factor. Consider the situation in which a user may be more concerned with image category relevance, in which case category confidence factors may be given a higher weighting in the ranking and ordering of the search results.

Figure 7:
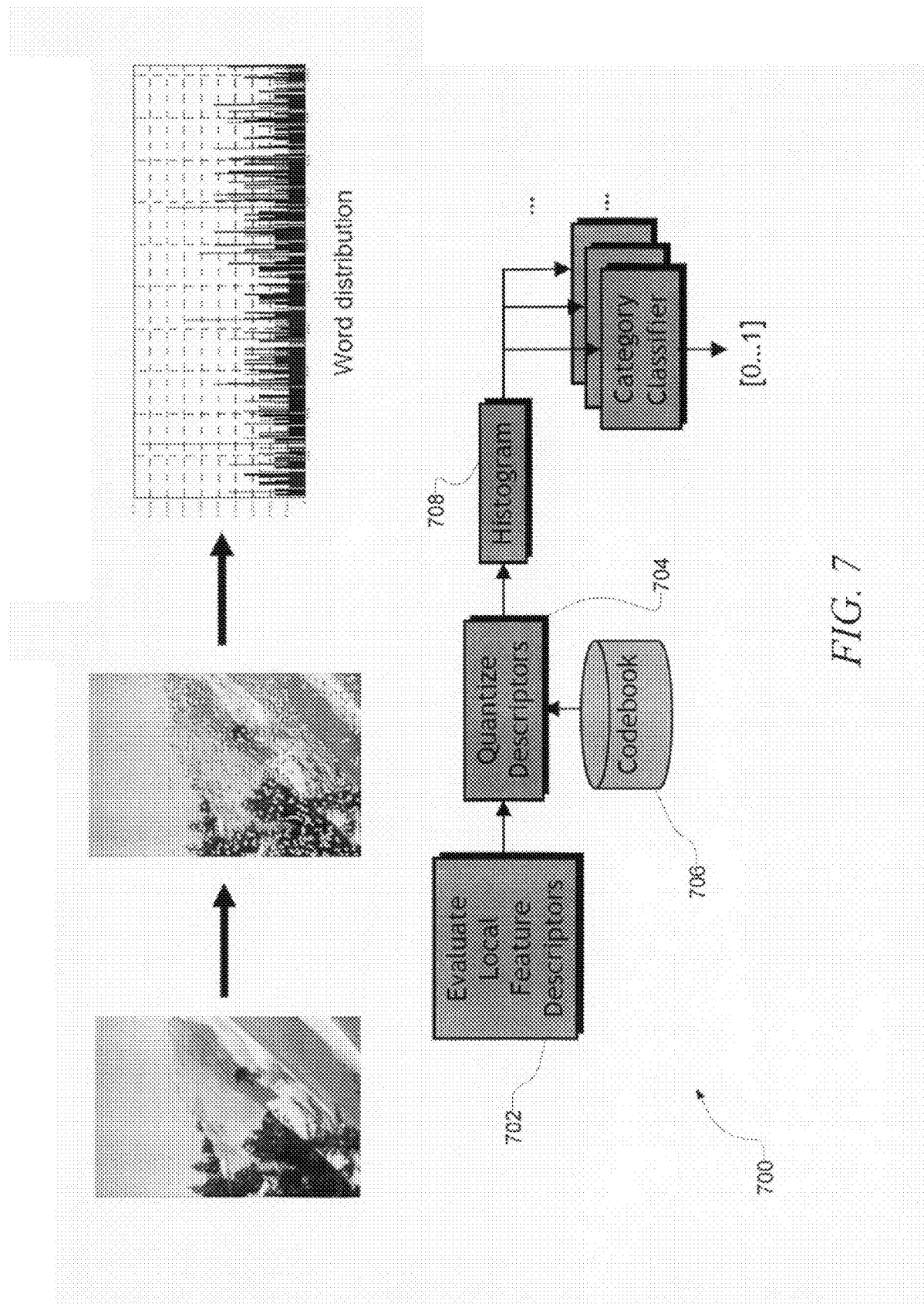
FIG. 7 is a diagrammatic representation of a "bag of words" image categorization model in which a scene category classifier may be used in order to automate classification of images into image scene categories.

FIG. 7 is a diagrammatic representation of a "bag of words" model 700 which may be implemented by the scene category classifier 130 in order to automate classification of images into image scene categories. In one example embodiment, the output of a scene category classifier 130 may be reflected in the scene category data stored in a semantic image description table 218 within the database 132. Additionally, the model 700 may be used to generate confidence factors 226 for each image-scene category association. The example "bag of words" model 700 illustrated in FIG. 7 seeks to characterize an image according to a distribution of visual "words" contained within the image. The resulting distribution of visual "words" for a given image is a visual attribute of the image in and of itself, and is often used as an input factor to one or more category classifiers.

Operation of the model 700 begins at operation 702 with the evaluation of local feature descriptors for a particular image. Such local feature descriptors may include a Scale-Invariant Feature Transform (SIFT), which is used to construct a "visual" vocabulary. For example, local feature descriptors may be multi-dimensional continuous-valued vectors, and may be reduced to a finite vocabulary by quantization (operation 704). This vocabulary (e.g., code book 706) may be determined by training, such as, for example, a clustering process such as k-means.

Figure 8:
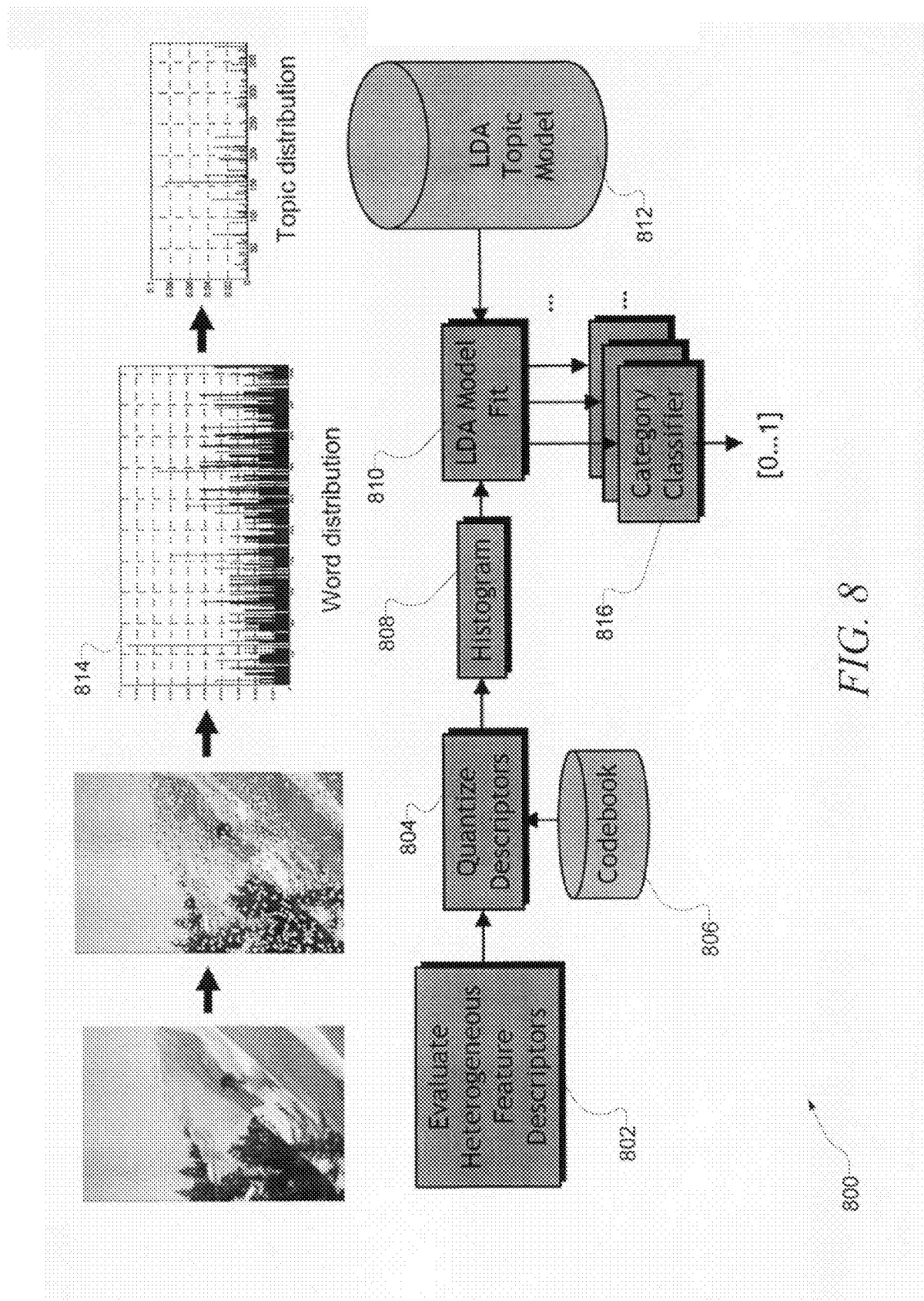
FIG. 8 is a diagrammatic representation of an extended "bag of words" image categorization model, according to an example embodiment.

FIG. 8 is a diagrammatic representation of an extended "bag of words" image categorization model 800, according to an example embodiment.

As with the model 700 described above with reference to FIG. 7, the image categorization model 800 commences at operation 802 with the evaluation of heterogeneous feature descriptions. With respect to the operation 702 of the model 700, this model 700 may be limited by the discriminative capability of the underlying image features. For example, SIFT features encode affine invariant local luminance structure. However, color and geometric information is typically not available in the SIFT descriptor. According to an example embodiment, several different types of features may be provided to overcome "blind spots" in the SIFT categorization system. These may include, during a descriptor quantization operation 804, quantizing image "blobs" obtained by segmenting an image into regions, and then computing aggregate features in each region (e.g., color, texture, shape and position properties). A further feature may include randomized patches, which are dimensionally reduced and encoded square patches of pixels drawn randomly from the image at different positions and scales.

The image categorization model 800 further includes a Latent Dirichlet Allocation (LDA) model operation 810, which receives an LDA topic model as input 812, and is performed with respect to a word distribution 814, prior to provision of the word distribution 814 to one or more category classifiers 816. One property of the "bag of words" model is that word distribution across an entire image may be represented by a mixture of contributions from various distinct components (e.g., a foreground object and a background object). The LDA model may be applied to model an overall image distribution of "words" as a sparse mixture of contributions from a set of fixed components ("topics"). The inferred topic distribution for a given image, based on the LDA topic model, is itself a visual attribute of the image, and can be the basis for a visual similarity search, and for scenic category classification.

Turning now to the visual attribute search engine 118, and specifically the visual similarity module 122, the visual similarity module 122 may employ any one of a number of different measures of image similarity. These measures may include, for example, source data, three dimensional scene data and concept data. Images from the same source may, for example, be from a common camera, and may be user modified. Such user modifications may include transformation such as rotation, resizing, cropping, blurring, sharpening, contrast enhancement, JPEG compression, brightness enhancement, color conversions (grayscale) and noise addition. In one example embodiment, the visual similarity module 122 may consider a predetermined number of images (e.g., 1,000 images) from a natural image dataset. The visual similarity module 122 may perform any number of different transformations (e.g., those mentioned above) in order to "normalize" the dataset, and an evaluation may be performed on the resulting transformed images (e.g., number of images× number of transformations).

Regarding images of a common three-dimensional scene, the visual similarity module 122 may use images from a determinable dataset (e.g., the Oxford dataset). Such a dataset may contain images of a well-known landmark, for example, taken in different lighting conditions, and from a various viewpoints. Certain images in the dataset may contain landmarks that have partial occlusion. Further, the visual similarity module 122 may use "good" images (e.g., images containing a complete landmark) and OK images (e.g., images containing at least 25% of the landmark).

With respect to images having a common concept, the visual similarity module 122 may leverage functionality provided by a scene category classifier 130 in order to identify images relating to the same concept.

Figure 9:
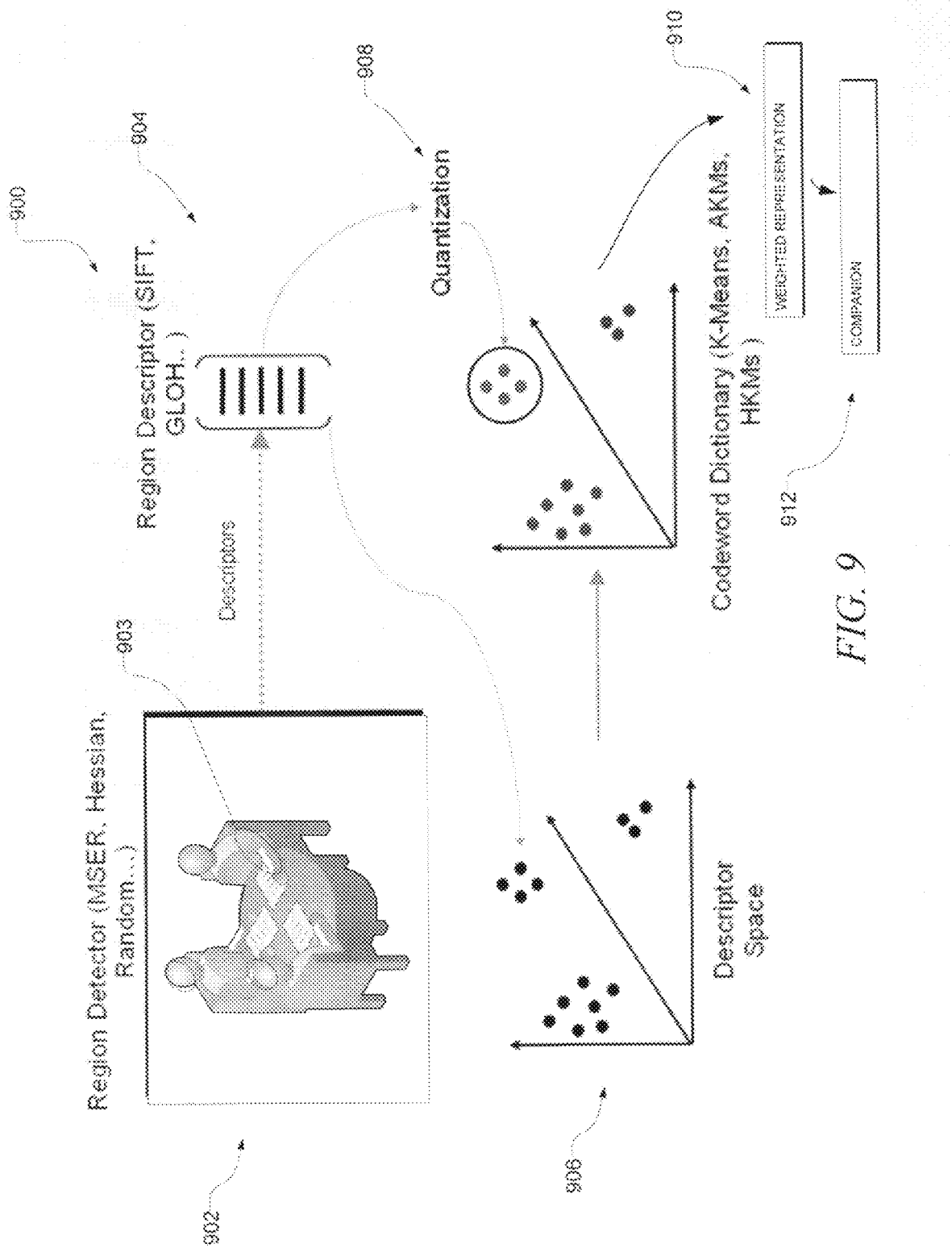
FIG. 9 is a process diagram illustrating a method, according to an example embodiment, that may be used by the scene category classifier to generate a similarity measure between various images.

FIG. 9 is a process diagram illustrating a method 900, according to an example embodiment, used by the scene category classifier 130 to generate a similarity measure between various images. As noted above, the scene category classifier 130 may use a "bag-of-words" model.

At a region detection operation 902, the scene category classifier 130 computes interest points and/or region detectors 903 (e.g., Hessian Affine, Difference of Gaussian, Maximally Stable External Regions, random regions etc.) For example, Hessian Affine may be used to identify invariant regions, as it may provide more regions than other detectors and is robust to the transformations on images. Performance of a detector may be improved by increasing a number of regions detected per image.

At operation 904, regional descriptors (e.g., SIFT, GLOH etc.) are generated to represent the detected regions. SIFT is one of several computer vision algorithms that may be used for extracting distinctive features from an image, and provides an advantage in that the features obtained by SIFT are invariant to image scale, and rotation.

The region descriptors generated at operation 904 may accordingly be regarded as providing a "descriptor space" 906.

At operation 908, these regions, represented by the region descriptors, are quantized using a code book 806. The code book 806 may be generated using a clustering method (e.g., k-means, approximate k-means, hierarchical k-means etc). For example, the k-means algorithm is an algorithm to cluster objects based on attributes into k partitions. In one example embodiment, a "nearest neighbor" may be used to evaluate the distance between two points to speed up clustering.

At operation 910, the quantisized regions are weighted using a weighting scheme, to provide a weighted representation of the image. An output of the weighing operation may be an n-dimensional vector. Several different weighted representations may be used, in various embodiments. A term frequency-based representation of an image, (e.g. a histogram 808 of visual words) may be used. At operation 912, the n-vectors representing various images may be used to compare these images. Different metrics may be used to determine a "distance" between two images. In various embodiments, different comparison metrics may be used (e.g., a "dot product") metric, the distance being representative of the similarity or dissimilarity between two images.

According to a further example embodiment, there is provided a method and system that allows a user to categorize (e.g., tag) results of a visual search (e.g., a semantic image description search or a visual attribute search) according to various user-defined scene categories. In an example embodiment, a background process may operate to train new image classifiers 128 for new, user-defined categories. The above-described visual attribute search (e.g., visual similarity search) capabilities may facilitate "tagging" or other classification, by grouping visually similar images together. The result of a semantic description search (e.g., a scene category search) may enable rapid identification of "false positives", and allow a user to conveniently tag such "false positives" as counterexamples for a particular scene category. The background training process may enable the categories to be learned and improved upon transparently, without interfering with a user's ongoing activities. For example, a background daemon may periodically re-train scene classifiers, based on a current set of images and user-specified tags, and then refresh the scene category values for order of the images in the set.

Figure 10:
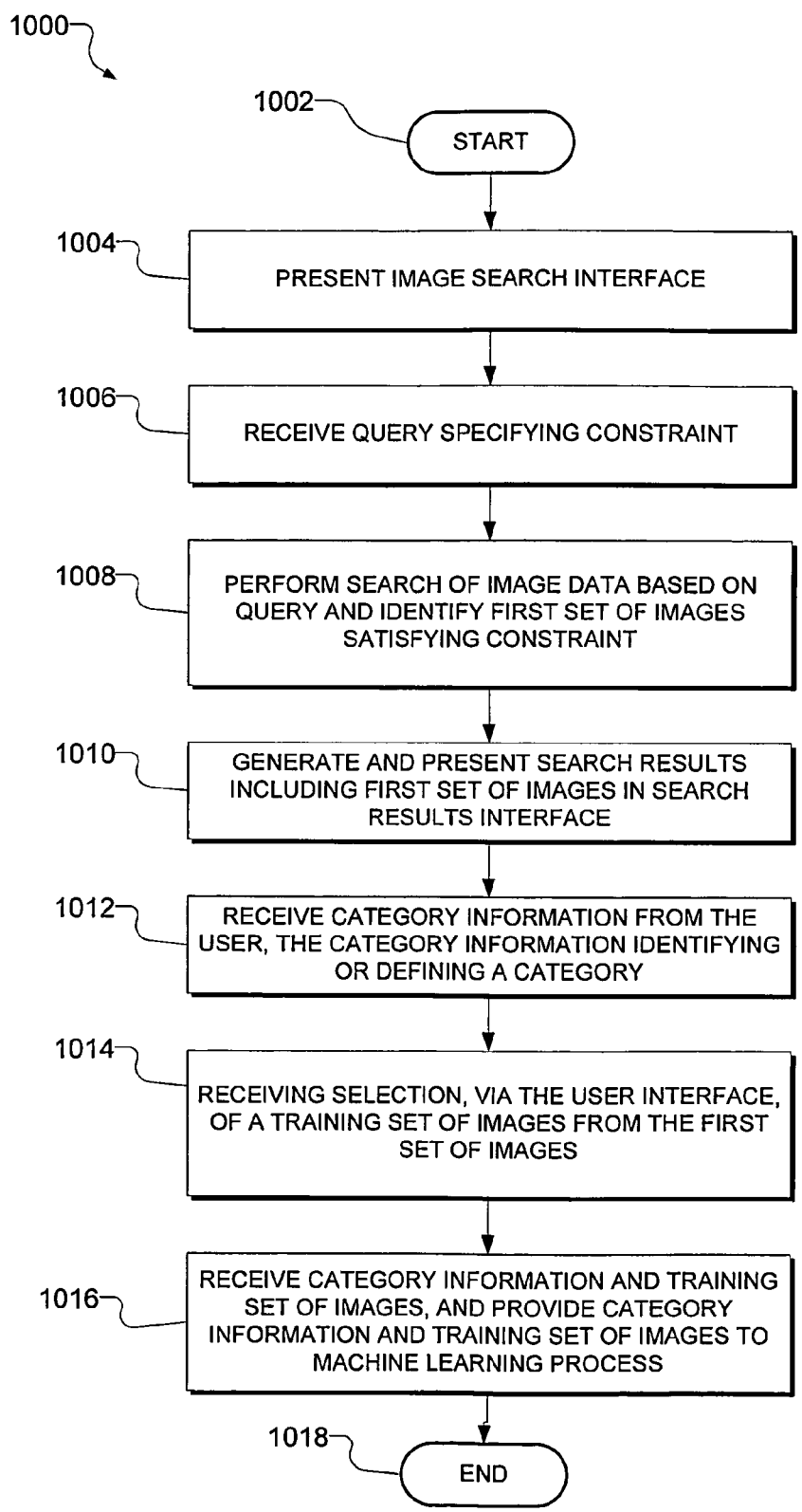
FIG. 10 is a flow chart illustrating a method, according to an example embodiment, to train an image category classifier to identify images for an image category.

FIG. 10 is a flow chart illustrating a method 1000, according to an example embodiment, to train an image category classifier to identify images for an image category. The method 1000 may be performed by the components of the image processing application 112, described above with reference to FIG. 1.

The method commences at operation 1002, and proceeds to operation 1004 with the presentation, via the user interface generator 116, of an image search interface to a user. The image search interface may, as described above, include both a semantic description search component and a visual attribute search component, allowing a user to respectively specify semantic image description and/or visual attribute constraints for a search.

At operation 1006, a query including one or more constraints, as inputted by a user into the image search interface or derived based on user interaction with the image search interface, is received at search engines of an image processing application 112.

At operation 1008, search engines of the image processing application 112 perform a search of an image database 132, based on the query, and identify a first set of images satisfying the one or more constraints of the received query.

At operation 1010, the user interface generator 116 generates and presents search results, including a set of images, in a search result interface.

At operation 1012, the image classifiers 128 may receive, from a user, category information specifying an image category. For example, referring to the example interface shown in FIG. 4, category information may be a user selected in the interface module 502, from the scene category descriptors 404. Alternatively, a descriptor (e.g., a tag or the like) may be received via appropriate input field (not shown) presented within the interface. In this way, a user may be enabled to define a new category (e.g., tag) according to which images may be categorized or classified. In a further embodiment, in relation to a textural description for a new category, further attributes for a new category may also be received at operation 1012. For example, a user may specify that only a certain type of image be classified within the new category, or may specify any number of other constraints that are applicable to the relevant category.

At operation 1014, the image classifiers 128 may receive selection, by a user via the search result interface, of a training set of images, the training set of images being user-selected from the set of images presented in the search result at operation 1010. The selection by the user of the training set of images may be performed in a near real-time manner, in that the selection may involve an active and continual monitoring of user interaction with user interface using a background process. The background process may, for example, be a part of the image processing application 112, and operate to continually monitor the user interaction with a search result set, and provide information regarding such interactions to the image classifiers 128.

In one embodiment, the selection of the training set may include both positive and negative examples of images that are appropriate for a particular category. For example, the search result interface, in which the set of images are presented at operation 1010, may provide functionality that allows a user to flag a particular image as being a positive (e.g., affirmative) or a negative (e.g., a counter) example image for a particular image category. In one example embodiment, the user, using an input device, (e.g., a mouse or other pointing device) may toggle between a positive or negative selection, indicated either by a green coloring or red coloring that is displayed in association with a particular selected image. Consider an example in which a user tags images as "boat" or "not boat", while interacting with the search engines. Offline (and potentially in the background), a process may collect visual attributes for the "boat" and "not boat" images, and train one or more classifiers accordingly. The process may then apply the classifier to all of the images in a database, and store the resulting values. In this way, the user does not explicitly orchestrate category training.

In a further embodiment, a user may be able to provide a "confidence factor" to indicate the user's confidence in a particular image as being a representative of an image category. For example, a confidence factor rating scale (e.g., good, medium, poor) may be presented to a user in conjunction with an image presentation, thus allowing a user to designate a particular image as being representative, or counter representative, of a particular category according to the presented scale.

At operation 1016, the image classifiers 128 receive the category information and the training set of images, as described above, and provide the category information and training set of images to a machine learning process (e.g. a support vector machine) employed by the image classifiers 128 in order to perform training.

The method 1000 then ends at operation 1018.

Modules, Components and Logic

Certain embodiments are described herein as including logic or a number of components, modules, or mechanisms. A component may be a tangible and non-transient unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" may encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, a data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
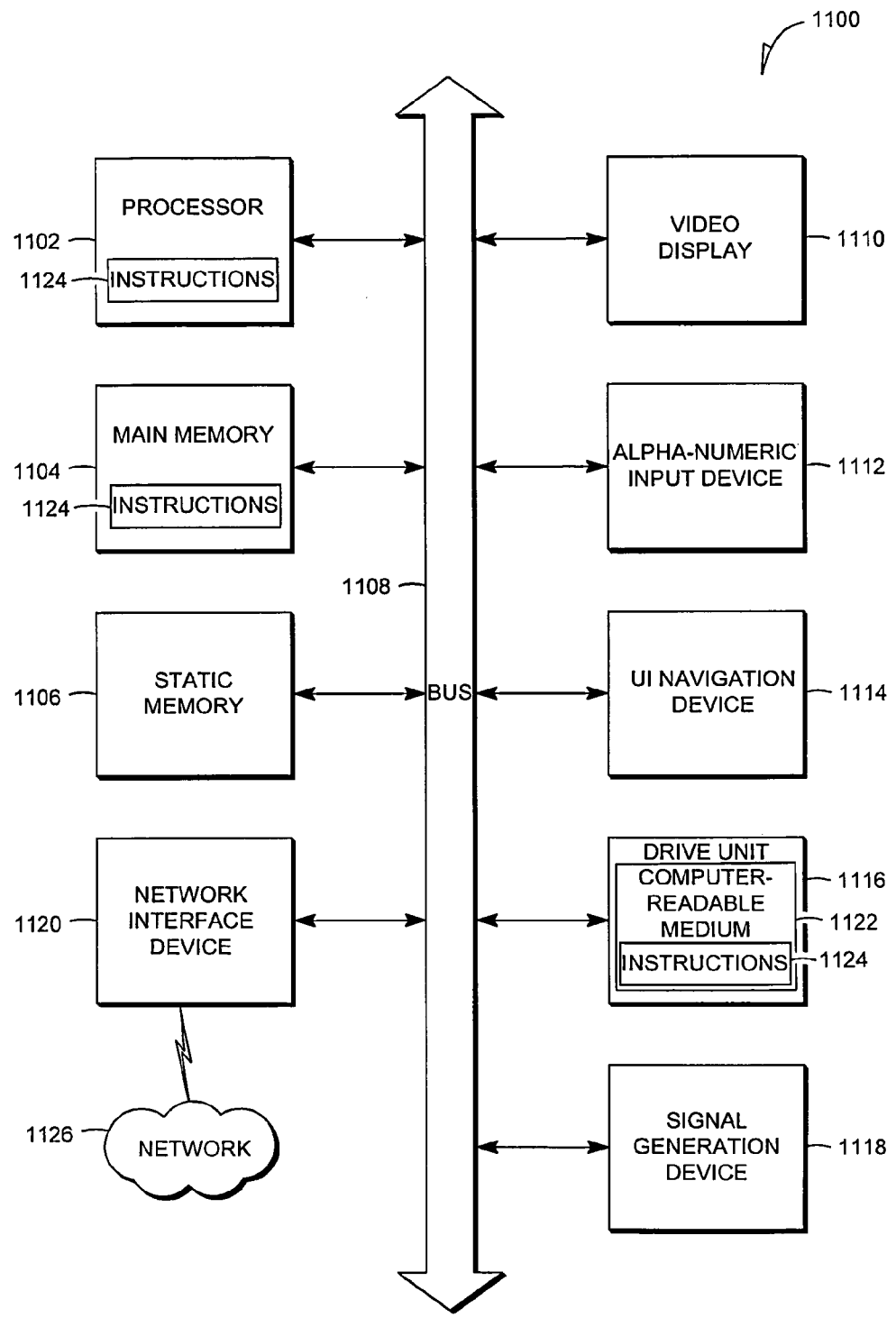
FIG. 11 is a block diagram of machine in the example form of a computer system within which set instructions, for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software 1124) embodying or used by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of tangible and non-transient machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1124 may further be transmitted or received over a communications network 1126 using a transmission medium. The software 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Example Three-Tier Software Architecture

In some embodiments, the described methods may be implemented using a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface module (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 127 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a first query that provides a scene category constraint that includes a semantic description descriptive of the scene category constraint;
   performing a first search of a plurality of images, responsive to the first query, to identify a first set of images satisfying the scene category constraint that is provided by the first query and inclusive of the semantic description descriptive of the scene category constraint;
   presenting a first search result that includes the first set of images identified as satisfying the scene category constraint that is provided by the first query and inclusive of the semantic description descriptive of the scene category constraint;
   receiving a second query that provides a visual similarity constraint with reference to a first image among the first set of images;
   performing a second search of the first set of images, responsive to the second query, to identify a second set of images, within the first set of images, that satisfy the visual similarity constraint,
      the second search being performed by a processor of a machine; and
   presenting a second search result that includes the second set of images identified as satisfying the visual similarity constraint,
      the visual similarity constraint including a visual attribute common to the second set of images.

2. The method of claim 1, wherein the receiving of the second query includes:
   receiving user-selection of the first image; and
   determining the visual similarity constraint based on the user-selection of the first image.

3. The method of claim 1, wherein the scene category constraint is a classification constraint.

4. The method of claim 3, wherein the classification constraint specifies an image category, the method including identifying the first set of images as being categorized within the image category.

5. The method of claim 4, wherein the image category is specified by a textual tag.

6. The method of claim 1 including using the visual similarity constraint to identify the second set of images as being visually similar to the first image.

7. The method of claim 6, including:
   determining the visual similarity constraint based on the first image.

8. The method of claim 7, wherein the visual similarity constraint comprises at least one of a bag of words or a Latent Dirichlet Allocation (LDA) visual topic.

9. The method of claim 1, wherein the second query provides the visual similarity constraint with reference to a plurality of query images among the first set of images.

10. The method of claim 1, wherein the second query is a compound query that provides both the visual similarity constraint and a further constraint that is supplemental to the visual similarity constraint.

11. A method comprising:
   presenting a first portion of an image search interface, the first portion being configured to receive a scene category constraint that includes a semantic description descriptive of the scene category constraint;
   presenting a second portion of the image search interface, the second portion being configured to receive a visual similarity constraint specified with respect to a first image that satisfies the scene category constraint that includes the semantic description descriptive of the scene category constraint
   receiving, via the image search interface, a first query against an image database, the first query including the visual similarity constraint to identify a first set of images in the image database as being visually similar to the first image that satisfies the scene category constraint that includes the semantic description descriptive of the scene category constraint;
   presenting, to a user, the first set of images responsive to receiving the first query; and
   receiving a selection, from the user, of a selected image from the first set of images as a further constraint of a further query against the image database,
      the receiving of the selection being performed by a processor of a machine.

12. The method of claim 11, wherein the first query includes both the scene category constraint and the visual similarity constraint.

13. The method of claim 11, wherein the scene category constraint is a scene category classification.

14. The method of claim 11, including performing a first search of the image database responsive to the first query.

15. The method of claim 11, wherein the further constraint is derived from at least one of semantic image description information associated with the selected image or visual attribute information of the selected image.

16. The method of claim 14, including performing a second search of the image database responsive to the further query.

17. The method of claim 11, wherein:
   the presenting of the second portion of the image search interface includes presenting a plurality of images for user-selection, and
   the receiving of the first query includes receiving a selection of a query image from among the plurality of images.

18. The method of claim 17, wherein the presenting of the plurality of images for user-selection includes identifying the plurality of images as belonging to a common image category.

19. The method of claim 17, wherein the presenting of the plurality of images includes presenting the plurality of images in a ranked order according to a category membership confidence factor.

20. The method of claim 11, including presenting the first and second portions of the image search interface concurrently within the image search interface, and wherein the receiving of the first query includes receiving a composite query including the scene category constraint and the visual similarity constraint.

21. A system comprising:
an interface component configured to receive a first query that provides a scene category constraint that includes a semantic description descriptive of the scene category constraint;
a first search engine configured to:
perform a first search of a plurality of images, responsive to the first query, and to identify a first set of images satisfying the scene category constraint that is provided by the first query and inclusive of the semantic description descriptive of the scene category constraint;
present a first search result that includes the first set of images identified as satisfying the scene category constraint that is provided by the first query and inclusive of the semantic description descriptive of the scene category constraint;
the interface component being further configured to receive a second query that provides a visual similarity constraint with reference to a first image among the first set of images; and
a processor configured by a second search engine that configures the processor to:
perform a second search of the first set of images, responsive to the second query, and to identify a second set of images, within the first set of images, that satisfy the visual similarity constraint; and
present a second search result that includes the second set of images identified as satisfying the visual similarity constraint,
the scene category constraint including a semantic description descriptive of the scene category constraint and the visual similarity constraint including a visual attribute common to the second set of images.

22. The system of claim 21, wherein the interface component is configured to receive a user selection of the first image as a specification of the visual similarity constraint, and wherein the second search engine configures the processor to determine the visual similarity constraint based on the user-selection of the first image.

23. The system of claim 21, wherein the scene category constraint is a classification constraint.

24. The system of claim 23, wherein the classification constraint specifies an image category, and wherein the first search engine is configured to identify the first set of images as being categorized within the image category.

25. The system of claim 21, wherein the second search engine is configured to use the visual similarity constraint to identify the second set of images as being visually similar to the first image.

26. The system of claim 25, wherein the second search engine is configured to determine the visual similarity constraint based on the first image.

27. The system of claim 21, wherein the second query provides the visual similarity constraint with reference to a plurality of query images among the first set of images.

28. The system of claim 21, wherein the second query is a compound query that provides both the visual similarity constraint and a further constraint that is supplemental to the visual similarity constraint.

29. A system comprising:
a user interface generator configured to:
present a first portion of an image search interface, the first portion being configured to receive a scene category constraint that includes a semantic description descriptive of the scene category constraint; and
present a second portion of the image search interface, the second portion being configured to receive a visual similarity constraint specified with respect to a first image that satisfies the scene category constraint that includes the semantic description descriptive of the scene category constraint; and
a processor configured by a search engine that configures the processor to receive, via die image search interface, a first query against an image database, the first query including the visual similarity constraint to identify a first set of images in the image database as being visually similar to the first image that satisfies the scene category constraint that includes the semantic description descriptive of the scene category constraint;
the user interface generator being further configured to:
present, to a user, the first set of images responsive to receiving the first query against the image database; and
receive a selection, from the user, of a selected image from the first set of images as a further constraint of a further query against the image database.

30. The system of claim 29, wherein the first query chides both the scene category constraint and the visual similarity constraint.

31. The system of claim 29, wherein the scene category constrain is a scene category classification.

32. The system of claim 29, wherein the search engine configures the processor to perform a first search of the image database responsive to the first query.

33. The system of claim 29, wherein the further constraint is derived from at least one of semantic image description information associated with the second image or visual attribute information of the selected image.

34. The system of claim 32, including a further search engine configured to perform a second search of the image database responsive to the further query.

35. The system of claim 29, wherein the user interface generator is configured to:
present a plurality of images for user-selection, and
receive selection of a query image from among the plurality of images.

36. The system of claim 35, including a classifier configured to identify the plurality of images from the image database as belonging to a common image category.

37. The system of claim 35, wherein the user interface generator is configured to present the plurality of images in a ranked order according to a category membership confidence factor.

38. The system of claim 29, wherein the user interface generator is configured to present the first and second portions of the image search interface concurrently within the image search interface, and is configured to receive a composite query including the scene category constraint and the visual similarity constraint.

39. A non-transitory tangible machine-readable medium embodying instructions that, when executed by at least one processor, cause the at least one processor to perform operations comprising:
receiving a first query that provides a scene category constraint that includes a semantic description descriptive of the scene category constraint;
performing a first search of a plurality of images, responsive to the first query, to identify a first set of images satisfying the scene category constraint that is provided by the first query and inclusive of the semantic description descriptive of the scene category constraint;

presenting a first search result that includes the first set of images identified as satisfying the scene category constraint that is provided by the first query and inclusive of the semantic description descriptive of the scene category constraint;

receiving a second query that provides a visual similarity constraint with reference to a first image among the first set of images;

performing a second search of the first set of images, responsive to the second query, to identify a second set of images, within the first set of images, that satisfy the visual similarity constraint; and presenting a second search result that includes the second set of images identified as satisfying the visual similarity constraint, the scene category constraint including a semantic description descriptive of the scene category constraint and the visual similarity constraint including a visual attribute common to the second set of images.

40. A non-transitory tangible machine-readable medium embodying instructions that, when executed by at least one processor, cause the at least one processor to perform operations comprising:

presenting a first portion of an image search interface, the first portion being configured to receive a scene category constraint that includes a semantic description descriptive of the scene category constraint;

presenting a second portion of the image search interface, the second portion being configured to receive a visual similarity constraint that includes the semantic description descriptive of the scene category constraint;

receiving, via the image search interface, a first query against an image database, the first query including the visual similarity constraint to identify a first set of images in the image database as being similar to the first image that satisfies the scene category constraint that includes the semantic description descriptive of the scene category constraint;

presenting, to a user, a first set of images responsive to receiving the first query; and receiving a selection, from the user, of a selected image from the first set of images as a further constraint of a further query against the image database.

41. A system comprising:

first means for receiving a first query that provides a scene category constraint that includes a semantic description descriptive of the scene category constraint; second means for:

performing a first search of a plurality of images, responsive to the first query, and to identify a first set of images satisfying the scene category constraint that is provided by the first query and inclusive of the semantic description descriptive of the scene category constraint;

presenting a first search result that includes the first set of images identified as satisfying the scene category constraint that is provided by the first query and inclusive of the semantic description descriptive of the scene category constraint;

the first means further for receiving a second query that provides a visual similarity constraint with reference to a first image among the first set of images; and third means for:

performing a second search of the first set of images, responsive to the second query, and identify a second set of images, within the first set of images, that satisfy the visual similarity constraint; and presenting a second search result that includes the second set of images identified as satisfying the visual similarity constraint, the scene category constraint including a semantic description descriptive of the scene category constraint and the visual similarity constraint including a visual attribute common to the second set of images.

* * * * *